United States Patent [19]

Posdal

[11] Patent Number: 4,942,052
[45] Date of Patent: Jul. 17, 1990

[54] METHOD FOR PRODUCING BLOCKS OF CHEESE CURD

[75] Inventor: James R. Posdal, Glenview, Ill.

[73] Assignee: Kraft, Inc., Glenview, Ill.

[21] Appl. No.: 277,298

[22] Filed: Nov. 29, 1988

[51] Int. Cl.$^5$ .................. A23C 19/00; B30B 11/00
[52] U.S. Cl. ................................ 426/512; 100/39;
100/98 R; 426/518
[58] Field of Search ........... 426/512, 518, 486, 517;
99/454, 472; 100/39, 97, 98 R

[56] References Cited

U.S. PATENT DOCUMENTS 3,763,769 10/1973 Bysouth et al. .................. 426/512
4,382,969  5/1983 Sadler ............................... 426/512

Primary Examiner—George Yeung
Attorney, Agent, or Firm—Fitch, Even, Tabin & Flannery

[57] ABSTRACT

Disclosed are method and apparatus for continuously producing blocks of cheese curd from a sheet of cheese curd. The apparatus may include means for producing the sheet of cheese curd but includes inclined surfaces for guiding the sheet into a conditioning tower. The tower receives the sheet in overlying face-to-face relation. A lower slide gate is disposed at the bottom of the tower to permit build up of a curd mass in the tower. Thereafter, a combination sliding gate and knife blade positioned above the slide gate is closed so as to cut a block of cheese curd above the lower slide gate. A carton may be elevated to telescopically surround a discharge section provided at the bottom of the tower to receive the block. When the knife blade closes, the curd thereabove is supported and the lower slide gate is then opened, allowing the block to descend through the discharge section into the elevated carton. Thereafter, the carton is lowered to withdraw the block from the tower and the slide gate is closed to accommodate another cycle of operation.

5 Claims, 2 Drawing Sheets

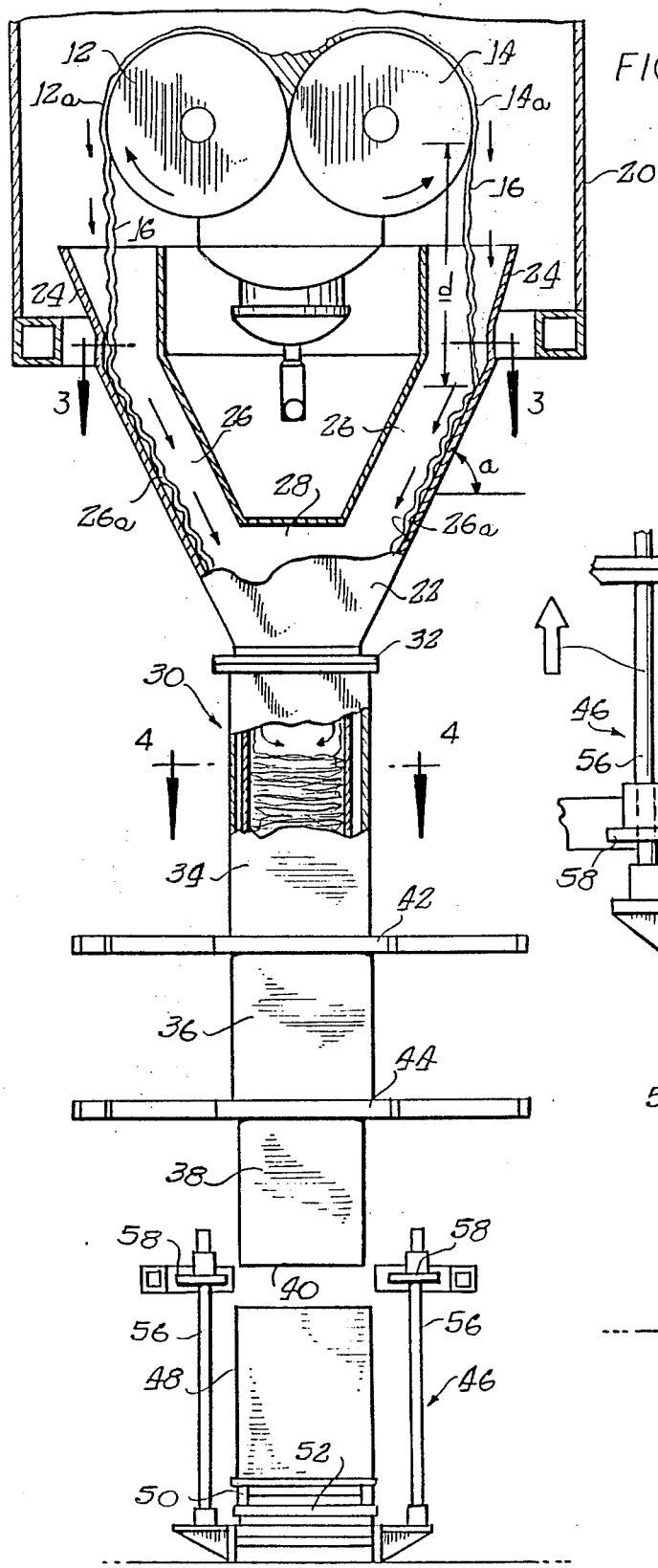
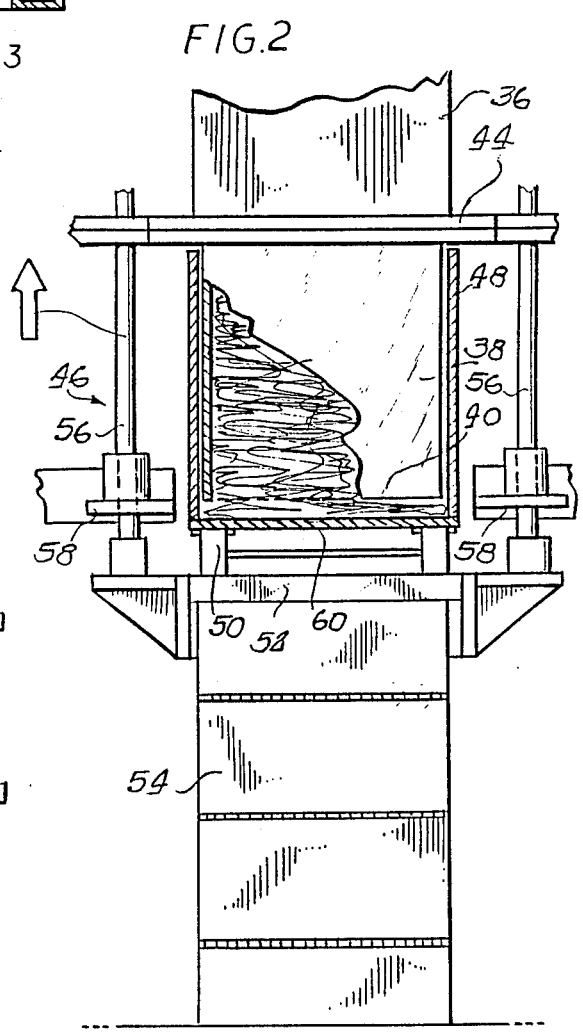
FIG. 1.
FIG. 2

METHOD FOR PRODUCING BLOCKS OF CHEESE CURD

BACKGROUND OF THE INVENTION

1. Field of the Invention

The present invention relates to a method and apparatus for forming a block of cheese, and more particularly relates to method and apparatus for the collection of sheets of cheese curd and forming the cheese curd sheets into a block.

2. Description of the Prior Art

Over the years, many arrangements have been proposed for the commercial production of cheese and cheese products. One particularly successful arrangement is disclosed in three Letters U.S. Pat. Nos. 3,292,259; 3,353,269; and 3,404,009. As disclosed in these patents, cheese curd is provided in granular form, comprising particles or small aggregations of particles from which substantially all or most of the whey has been drained or otherwise removed. The curd granules are then introduced into a conditioning tower where they are inherently pressed together prior to subsequent hooping at another station. The curd granules are compressed by a weighted plate lowered into the tower. The plate includes a downwardly-projecting ring-shaped member, V-shaped in cross section, which is pressed into the top of the cheese curd granules located at the top of the conditioning tower. While holding the plate in place, the tower is raised so as to eject a pressed curd mass from the bottom of the tower. The curd mass is received in a pan, and forms a generally pyramidal shape. The V-shaped ring facilitates the eve spreading of the curd mass in the pan and aids in maintaining the structural integrity of the upper part of the curd mass, generally preventing disintegration or other deformation thereof. A heated pressure plate applied to the pyramidal curd in the pan flattens the mass to a more uniform depth in the pan to facilitate subsequent operations performed on the curd mass.

In Letters U.S. Pat. Nos. 3,468,026, 4,061,794 and 4,152,101, method and apparatus are disclosed for forming blocks of cheese from cheese curd. Cheese curd is fed into the top of an evacuated perforated column, with vacuum serving to reduce air pockets in the cheese curd. Curd in the lower portion of the column is compressed by the weight of superimposed curd to press out whey therefrom.

In Letters U.S. Pat. No. 3,468,026, the curd may optionally be compressed by forcing the curd into a duct leading to an extrusion nozzle which is blanked off during compression of the curd in the duct. Curd in the tower is lowered by lowering a platform supporting the curd mass. The frictional resistance in the tower, however, was sometimes high enough to cause fractures in the column of cheese curd upon lowering of the curd mass.

In Letters U.S. Pat. Nos. 4,061,794 and 4,152,101, when a sufficient quantity of curd is placed in the chamber, air at elevated pressures is injected in the top of the chamber to consolidate and compress the curd therein, and to press whey from the curd mass through perforations in a liner disposed within the tower. Mention is made in these patents that air is exhausted from the column prior to filling the column with a mixture of cheese curd and salt. However, it is clear that the pressure in the column (whether caused by positive or negative pressures in the column) is controlled so as to prevent forcing the crumbled curd through the perforations of the column wall. The low pressure is sometimes described in the patents as being provided by a "vacuum means", however, the low pressure, even if reduced to sub-atmospheric levels (i.e., a "vacuum") would still have to be of a small magnitude to prevent extruding of curd through the perforate container walls. When curd is ready to be dispelled from the chamber, a guillotine blade supporting the curd mass in the chamber from below is retracted and the curd mass is brought into contact with a movable platform. As the platform is lowered, the curd mass exiting the chamber increases in size. After the desired amount of curd has been extracted from the chamber, the guillotine blade separates the curd mass from the curd remaining in the chamber, above the guillotine blade. The movable platform is thereafter raised to press the block of cheese curd against the underside of the guillotine blade to provide further whey extraction from the block.

Further improvements in the mass production of cheese and cheese products are still being sought to achieve more economical production costs and to avoid the limitations discussed above.

An improved process for the manufacture of cheese is described in co-pending U.S. patent application Ser. No. 649,838, filed Sept. 11, 1984. The invention comprises the production of a sheet of cheese curd which should not be extensively broken up and should retain its sheet form. However, the collection of this sheet of cheese curd in commercial operations has proved to be difficult and is a principal object of the method and apparatus of the present invention.

SUMMARY OF THE INVENTION

It is therefore an object of the present invention to provide improved methods and apparatus for the commercial mass production of cheese curd blocks with improved economy and rates of production.

Another object of the present invention is to provide methods and apparatus for the continuous production of cheese curd blocks from cheese curd produced in a sheet or strip form without substantially changing the curd structure. Another object of the present invention is to provide a conditioning tower with a discharge vacuum lock which maintains vacuum in the conditioning tower while providing discharge of a curd block to the atmosphere.

These and other objects of the present invention are provided in a method for continuously forming blocks of cheese curd comprising the steps of:

forming a sheet of cheese curd;

providing a conditioning tower for receiving the curd in sheet form;

conveying curd sheets from the sheet forming step to the conditioning tower;

causing the sheet of cheese curd within the tower to form overlying sheet portions without substantial disruption or tearing of the sheet;

applying a vacuum in the tower to facilitate compacting the overlying portions of the sheet in intimate engagement with one another while reducing air voids in the compacted layers and to press lower portions of the sheet of curd together under the weight of superior layers so as to form a pressed curd;

cutting the pressed curd at the bottom of the tower to form the block of cheese curd beneath an overlying mass of cheese curd; and supporting the overlying pressed cheese curd in the tower while removing the block of cheese curd from the tower.

Other objects of the present invention are attained in apparatus for carrying out the above-described method, comprising:

a sheet conveying means having a low-friction, inclined surface for receiving and substantially continuously supporting a major portion of a sheet of cheese curd and for conducting the sheet of cheese curd in a desired direction therebelow;

a conditioning tower having an imperforate upper portion disposed beneath the conveying means for receiving and directing the sheet of cheese curd so as to guide said sheet to form overlying sheet-portions and accumulate compressed overlying sheet portions to form a block of cheese curd, and a lower discharge portion;

a knife gate retractably separating the upper portion of the tower into two sections, including an upper section for receiving the curd sheet and a lower section for block formation;

a slide gate retractably separating the block-forming section and the discharge portion and supporting curd lying thereabove in the tower; and means for evacuating the curd-receiving and block-forming sections of the tower, and for continuously maintaining a vacuum in the curd-receiving section.

The present invention is also drawn to apparatus of the above-described type which further includes means for forming a sheet of curd, one example of which is a pair of counter-rotating drums to which a retentate is applied.

The invention substantially concerns the collection and layering of a fragile curd sheet without significant fractioning of the sheet and with face-to-face placement of sheets which can be pressed together.

BRIEF DESCRIPTION OF THE DRAWINGS

In the drawings, wherein like elements are referenced alike,

FIG. 1 is an elevational view, partially broken away, of an apparatus for producing a block of cheese curd from curd sheets;

FIG. 2 is an enlarged fragmentary view of the lower portion of the apparatus of FIG. 1 showing a receiving carton in an elevated position for receiving a block of cheese curd therein;

DETAILED DESCRIPTION OF THE PREFERRED EMBODIMENT

Figure 3:
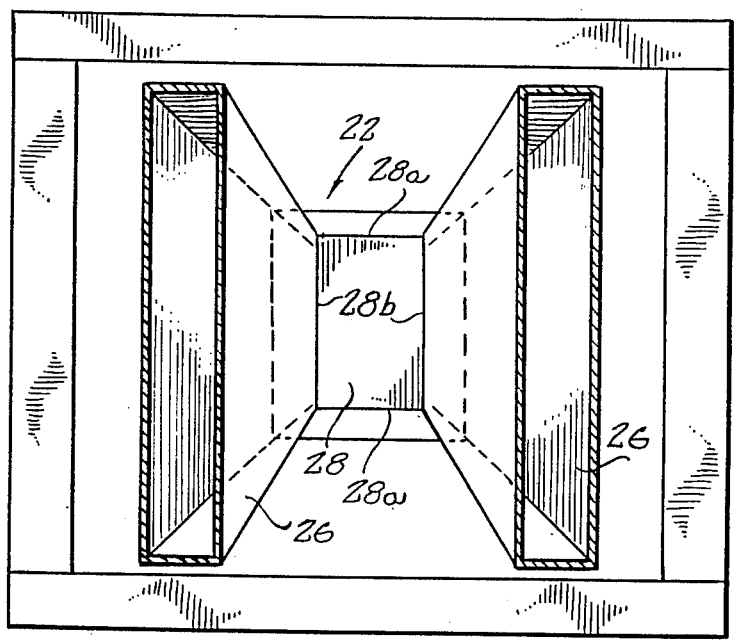
FIG. 3 is a top plan view taken in cross-section generally along the line 3—3 of FIG. 1 and looking in the direction of the arrows.

Referring now to the drawings, there is illustrated an apparatus 10 for forming a block of cheese curd from one or more sheets of cheese curd. The illustrated apparatus includes a vacuum drying unit for forming sheets of cheese curd, as disclosed in U.S. patent application Ser. No. 649,838, filed Sept. 11, 1984, the disclosure of which is herein incorporated by reference. Briefly, moisture, salts and lactose are removed from milk to provide a retentate having a controlled moisture content, generally ranging between about 50% and 83%. After adding cheese-making cultures to the retentate and fermenting the retentate in a prescribed manner, the retentate is spread on a heated surface where moisture is evaporated from the retentate under quiescent conditions. The preferred surface disclosed in the patent application consists of a pair of counter-rotating drums 12 and 14 rotating in the directions indicated by the arrows in FIG. 1. The retentate is compressed at the nip of the drums and a curd sheet is formed on the bottom surface of each drum. Doctor blades, not illustrated in FIG. 1, are provided at approximately locations 12a, 14a to separate the curd sheet formed on the drums from the surface thereof, without substantially disrupting the structure of the curd sheets 16 as they are doctored off from the surface of the drums.

The drum surfaces, as well as the feed system for spreading the retentate thereon and the doctor blades, are maintained in a relatively high vacuum environment (approximately 0.04 atms) to reduce the boiling point of the liquid retentate, thereby providing the desired evaporation with a significantly lower cheese curd temperature (below about 85° F.) than would otherwise be required. A particular advantage of the present invention is the low moisture content (30% to 45% moisture) of the curd sheet removed from drums 12, 14. As a further important advantage, evaporation of the moisture is accomplished without undue heating of the curd sheet which is known to affect biological viability of the cheese curd. The curd sheets in the illustrated embodiment have a thickness generally ranging between 0.015 and 0.025 inches.

As the curd sheets are doctored off the surface of drums 12, 14, they are suspended a limited height between the doctor blades and the point where the curd sheet contacts the inclined surfaces 26a. The suspended height can be adjusted to provide a single continuous sheet or to provide a serial succession of sheets of a desired length.

While the apparatus according to the present invention would perform quite satisfactorily with a single continuous sheet, such is not generally required, and steps to ensure absolute sheet integrity over the entire length thereof need not be provided. In the preferred embodiment, a serial succession of separate sheets (each typically several feet long) are inserted into the product stream. The weight and strength of the curd sheet and the suspended height of the curd sheet generally determine the length of the sheet sections formed in the apparatus. According to other aspects of the present invention, the thickness of the curd sheets, their moisture content (and therefore their solids content) are carefully controlled to form sheets at least one foot long, preferably at least two feet long, and most preferably about 4 to 5 feet long. It is desirable that if the sheets separate when doctored off of the drums 12, 14 they should separate along lines generally perpendicular to the length or axis of the curd sheet, although some skewing of the separation line from perpendicular can be readily accomodated by the apparatus. Controlling the thickness, moisture content of the curd sheet, and providing the drums, doctor blades and vacuum enclosure and product feedpath (including the suspended height of the curd sheet) all contribute in providing the desired tearing of the curd sheet 16 into sheet sections of desired length and having leading and trailing edges generally perpéndicular to the length of the sheet (i.e., generally horizontal for the illustrated configuration).

As mentioned above, the drums 12, 14 are maintained in a vacuum environment, conveniently provided in an evacuated upper enclosure 20. The lower end of the enclosure connects to a y-section 22 having upper, funnel-shaped inlets or openings 24 extending into enclosure 20. As shown in the cross-sectional view of FIG. 1, y-section 22 is comprised of two inclined chutes 26 feeding into a common plenum chamber 28. The chutes are generally inclined at an angle a ranging between 45° and 80° to provide inclined surfaces 26a which slidingly convey the sheets 16 as they travel in a generally downward direction into a conditioning tower or vertical column 30.

The distance d which establishes the suspended height of the curd sheet between the points 12a and 14a of doctoring of the sheet 16 and the point where the sheet contacts the inclined surfaces 26a of the y-section 22 is set so as to avoid undesired tearing of the sheets 16 and preferably is no greater than 54 inches and is most preferably from about 20 inches to about 54 inches. The angle a of the inclined surfaces 26a and their co-efficient of friction are such as to convey the sheets at a speed nearly equal to the rate of removal of the sheets 16 from the drums 12, 14 but not such as would cause additional strain which would cause undesired tearing of the sheets 16.

The enclosure 20, y-section 22, the conditioning tower 30 and remaining portions comprising the product path are preferably formed from stainless steel material. The inclined surfaces 26a of the chutes 26 may be polished or even coated with a friction-reducing material on their inside product-contacting surface, although such has not been found necessary in the illustrated embodiment.

As will be seen herein, the product path for the cheese curd throughout the apparatus 10 is of an improved, simplified configuration which provides a considerable reduction in the maintenance required to preserve the desired sanitary conditions in the apparatus. The preferred material for forming the various components of the apparatus, and especially those components directly contacting the curd sheets, is stainless steel which is formed with a minimum of bends, folds or crevices.

A flange or connection 32 connects the bottom of y-structure 22 to the top of the conditioning tower 30. The distance between the doctor blades at points 12a and 14a and the connection 32, according to one feature of the present invention, may be as great as 120 inches and preferably ranges between about 50 and about 120 inches. This distance, along with the spacing, inclination and friction of the surfaces 26a, and the distance d, has been found to be important to provide the desired handling of the curd sheet 16, as well as a desired distribution of curd sheets within the conditioning tower 30.

The curd sheets 16 should be stacked in face-to-face relation in the conditioning tower 30. If the sheets are continuous, the sheets should accumulate in the conditioning tower 30 in a generally sinusoidal manner. If more than one continuous sheet 16 is accumulated on the tower 30, the sheets should interleave as they accumulate to avoid a split between the gathered sheets. In the preferred embodiment of the invention, wherein a serial succession of separate sheets are formed, the sheets tend to "bunch up" before entering the conditioning tower 30 and the bunched up sheets fall randomly into the tower. By the term "bunch up" is meant that the sheets have a crumpled or corrugated appearance.

In the illustrated embodiment, two drums 12, 14 are provided for the formation of two separate curd sheets 16, although the present invention also contemplates using only a single drum. In operation of the illustrated embodiment according to the principles of the present invention, the curd sheets 16 separate from the surfaces of drums 12, 14 and drop down to the y-section 22, whereupon they are conveyed along the inclined surfaces 26a to the plenum 28. Thus the curd sheets 16 are conveyed along the left-hand and right-hand surfaces 26a illustrated in FIG. 1, and generally cross each other at plenum 28. The sheets 16 traveling down the right-hand chute 26 are directed toward the left wall of vertical column 30 and vice-versa for the other, left-hand chute 26. Thus, the curd sheets generally fall so as to stack in face-to-face relation. Occasionally, curd sheets 16 from both chutes 26 to meet in plenum chamber 28 and fall generally in more central sections of vertical column 30. Although the bunched up sheets fall randomly into the tower, a relatively even distribution of curd sheets consistently forms within the central column. An advantageous even filling of the conditioning tower 30 is experienced with the apparatus of the present invention, to obtain advantages which will become apparent upon further description herein. One factor in providing even filling of the tower 30 is the path of travel of curd sheets 16 in the y-section 22 toward an opposite side of the tower 30. The inclined surfaces 26a provide a low coefficient of friction and suitable inclination to avoid bunching of the sheets prior to their entry into the tower. The inclined surfaces 26a are also positioned relative to the point of tearing and have a path length which imparts the desired, limited momentum to the curd sheets as they exit their respective chutes 26, to avoid disrupting the curd structure of the sheets.

If, however, it is desired to produce curd blocks from a continuous sheet of curd, the y-section 22 and its position relative to the conditioning tower 30 can be reconfigured to minimize the tearing effects of gravity, excessive momentum and strain as the curd sheet 16 travels along the product path.

Referring again to FIG. 1, the conditioning tower 30 comprises three aligned sections, viz. an upper curd-receiving section 34, an intermediate block-forming section 36 and a discharge section 38 having an open free end 40. Apparatus 42 comprises a combination of a sliding gate and a knife, and is of a type well known in the art. The apparatus 42 separates the upper curd-receiving section 34 from the block-forming section 36. A sliding gate 44 of a type well known in the art separates the block-forming section 36 from discharge chute 38, and provides a vacuum-tight seal at the downstream end of block-forming section 36.

Figure 4:
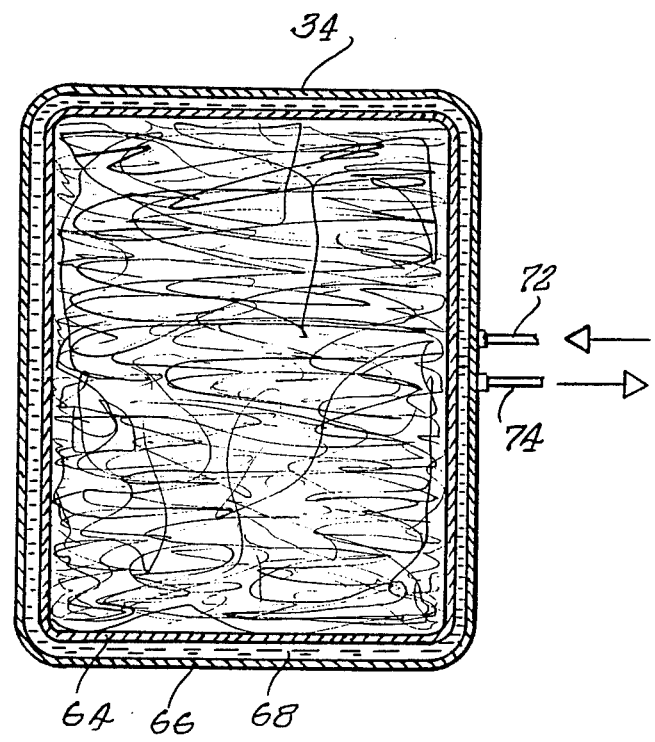
FIG. 4 is a cross-sectional view, taken in plan view, generally along the line 4—4 of FIG. 1 and looking in the direction of the arrows.

Referring now to FIG. 4, a cross-sectional view of the conditioning tower 30 is illustrated as having an internal product-contacting wall 64 and a spaced outer wall 66 between which is formed a continuous channel 68 for a jacket. An inlet connection 72 communicates with channel 68 at a point adjacent the connection flange 32. A discharge connection 74, also located adjacent connection flange 32, completes a path of coolant, preferably water. In the illustrated embodiment, the chamber 68 extends only through upper curd-receiving section 34 and the block-forming section 36. Coolant is recirculated in chamber 68 to maintain an equal temperature throughout. The temperature of the coolant preferably corresponds generally to the temperature of the cheese curd sheets 16 as they are doctored from drums 12, 14. This temperature is from about 70° F. to about 85° F. It has been found unnecessary to provide thermal control of discharge chute 38 by the double-wall construction illustrated in FIG. 4.

An elevator platform generally indicated at 46, (see FIG. 2) is associated with a palletized receiving carton 48, for removing blocks of cheese curd from the apparatus 10. The receiving carton 48 is carried by a sled 50 which travels on a roller conveyor, not shown. The elevator platform 46 includes a lower support bed 52. A hydraulic lift 54 of a type well known in the art is located beneath support bed 52 to provide the lifting force therefor. As support bed 52 is raised and lowered, vertical guide rails 56 travel in slide-type guides 58 which maintain proper alignment between the support bed 52, the receiving carton 48 carried thereon, and the discharge section 38, so as to provide a close-tolerance telescopic fitting for receiving carton 48 about substantially the entire length of the discharge chute 38. FIG. 2 illustrates the hydraulic lift in a fully extended upward direction wherein it can be seen that the lower free end 40 of discharge section 38 is located adjacent the bottom wall 60 of receiving carton 48, to receive a block of cheese curd exiting the apparatus 10.

Referring again to FIG. 1, operation of apparatus 10 is initiated with an empty conditioning tower 30 empty of cheese curd. The gate and knife of apparatus 42 are retracted so as to provide a continuous path for the curd sheets 16 from the drums 12, 14 to the sliding gate 44, maintained in a closed position. Curd sheets 16 falling through the product path accumulate against the sliding gate 44 on the block-forming section 36 and the upper curd-receiving section 34 while a vacuum is maintained throughout enclosure 20, y-section 22, curd receiving section 34 and block-forming section 36. A vacuum of from about 0.01 to about 0.1 atmospheres (atms) absolute pressure is preferred. Most preferably a vacuum of from about 0.02 to about 0.06 atms is used. This relatively high vacuum level prevents air entrapment between the curd sheets accumulating in the conditioning tower 30, substantially eliminating voids or pockets which might otherwise form, particularly in the absence of pressure being applied to the accumulating mass of curd sheets by pressurized air, rams or the like. The curd sheets fall substantially intact and without disruption of their internal structure, so as to accumulate against sliding gate 44. The upper curd receiving section 34 cooperates with the inclined surfaces 26a to induce the sheets to form overlying portions by laying one sheet on top of another and/or by generally sinusoidally folding sheets wholly or partly upon themselves. While various lengths of curd sheets are usually provided, the invention also pertains to the folding of a single continuous curd sheet 16 in the conditioning tower 30. In either event, overlying sheet portions accumulate in the conditioning tower sections 34, 36 in face-to-face relation. The sheets are evenly spread between plenum walls 28a (see FIG. 3) even if individual sheets are allowed to bunch together at one or the other plenum walls 28b.

The thickness, moisture content and solids content of the curd sheets 16 doctored off of drums 12, 14 is maintained such that a compact block of cheese curd is formed, under the weight of overlying curd sheet portions accumulated in upper curd-receiving section 34. Additional compaction of the cheese block however, is usually required in a cheese press after the cheese block is removed from the tower. It has generally been found necessary to provide a (generally less compressed) curd height in the upper section 34 of at least 42 inches, preferably from about 42 inches to about 80 inches, to adequately compress the curd mass in the block-forming section 36. For example, in the illustrated embodiment, the curd receiving section 34 provides a curd height of approximately 45 inches, which provides the pressure necessary for desired compression of the curd sheets in the block-forming section 36 to provide a block of cheese having a height of 30 inches. As seen, the cheese curd sheets are formed by gravity without the intervention of pressurized air, rams or like compressing forces to provide compact blocks of cheese curd.

It has been found in curd blocks formed according to the methods and apparatus of the present invention, that the overlying sheet portions (portions of the same sheet laying on top of each other and/or different sheets laying on top of each other) are joined together so intimately that the individual layers are indistinguishable to the unaided eye. The integrity of the block is so great as to resist even significant tension forces applied in axial directions of the column. Even when excessively tensioned, the blocks do not readily separate, there being a plurality of fibrous web-like interconnections running randomly between horizontally-oriented striations. These qualities of the curd block are observable only for curd blocks of very large size, much larger than the size of a consumer package. The texture, body, elasticity, and the like "structural" features of the cheese curd blocks are extremely satisfactory for curing to "table", "slicing" or "cutting" cheese, and such is a particularly important advantage of the present invention.

The mass of cheese curd in the block-forming section 36 is separated from the mass of cheese curd extending thereabove, and is withdrawn from apparatus 10 for further handling. Included in such handling is pressing of the formed block of cheese curd to provide denser texture. Pressing for a period of from about 0.5 to about 2 hours, preferably for about one hour, with or without vacuum, at a pressure of from about 20 to about 30 psig has been found to be suitable.

In the operation of apparatus 10, after the desired mass of cheese curd is accumulated in sections 34, 36, the sliding gate of apparatus 42 is closed to provide a separate discrete block of cheese curd in block-forming section 36. The sliding gate of apparatus 42 forms a vacuum-tight seal with the upper section 34, to obtain advantages which will become apparent herein. Next, elevator platform 46 is raised so as to telescope the receiving carton 48 about discharge section 38, as illustrated in FIG. 2. The sliding gate of apparatus 42 is thereafter retracted and the block of cheese curd in section 36 is allowed to slide down the discharge section 38 into the receiving carton 48. As illustrated in FIG. 2, the bottom free end 40 of discharge chute 38 is located close to the bottom wall 60 of receiving carton 48, so as to minimize free fall of the cheese block. Next, the sliding gate 44 is closed, and the hydraulic lift 54 is lowered to allow withdrawal of the wheeled cart 50, carrying the filled receiving container 48.

With gate 44 and the gate of apparatus 42 in a closed position, a totally enclosed chamber 36 is formed. Due to discharge to the atmosphere during removal of the curd block, the chamber 36 is filled with air at ambient pressure. Depending upon the relative volume of section 36 and the upper portion of apparatus 10, section 36 may or may not be required to be evacuated. In preferred operation, in order to optimize the efficiency and processing time of the apparatus, the enclosed chamber 36 is evacuated to approximately the same level as that present in the remainder of the apparatus, with a vacuum connection not illustrated in the Drawings. Thereafter, the knife gate of apparatus 42 is opened to allow the cheese curd in the upper curd receiving section 34 to slide downwardly into contact with sliding gate 44, with sheets of cheese curd continually accumulating at the top of the cheese curd mass in the curd-receiving section 34. In operation of one preferred embodiment of apparatus 10, it has been found that sheets of cheese curd can accumulate at levels up to the flange 32, and even slightly thereabove, without adversely affecting the ultimate compaction of the cheese curd in section 36. Thereafter, the cycle of cheese curd formation as explained above is repeated.

As indicated above, the apparatus according to principles of the present invention has particular advantage for producing cutting cheese. The curd block produced by the above-described apparatus forms blocks which do not crumble or oil off. Further, blocks produced according to the principles of the present invention are uniform and compact to provide a cutting cheese quality throughout the entire block. Also important to commercial operation, the apparatus and method of the present invention can be scaled up or down to produce cheese curd blocks of desired size and weight. For example, embodiments of the present invention continuously produce cheese curd blocks ranging in size between approximately 40 lbs. and 640 lbs., at production rates of up to 800 lbs. per hour. With the apparatus of the present invention, the cheese curd sheets are continuously accumulated and blocks of any desired size can be withdrawn without delaying the ongoing curd-forming process.

An important performance factor for cheese-making processes in general, is the temperature of the cheese curd throughout the product path of the curd-forming apparatus. Using the methods and apparatus according to the principles of the present invention, the temperature of the cheese curd exiting the apparatus is no more than about 85° F. Also, in traditional cheddaring tower technology, the tower is filled with a milled or stirred curd including significant quantities of whey which must be expelled or drained off, whereas the apparatus of the present invention provides a curd having the desired finished solids level, that is, a solids content substantially the same as the finished product and there is no whey removal step. Significant advantages in maintaining and cleaning the curd-forming apparatus, according to the present invention result.

As can now be seen, an improved simplified apparatus is provided consistent with continuous formation of cheese curd product in the conditioning tower 30 of apparatus 10, requiring only vacuum to obtain a uniform and compact cheese curd block.

The foregoing description and drawings merely explain and illustrate the invention and the invention is not limited thereto, except insofar as the appended claims are so limited. Those who are skilled in the art and have the disclosure before them will be able to make modifications and variations without departing from the scope of the invention.

What is claimed is:

1. A method of forming a block of cheese curd comprising the steps of:
   forming a sheet of cheese curd;
   collecting said sheet and placing portions of said sheet in a stacked face-to-face relation in a tower so as to superpose stacked portions one on top of another;
   applying a vacuum to said stacked portions of said sheet;
   pressing said stacked portions of said sheet under the weight of superposed stacked portions to form a pressed curd;
   cutting said pressed curd at the bottom of the tower to form a block of cheese curd beneath the overlying superposed portions; and
   supporting said superposed portions while lowering said block of cheese curd.

2. The method of claim 1 further comprising the steps of:
   providing a container underneath said block;
   raising the container into telescoping relation with said block; and
   lowering said block of cheese curd and said container away from said tower.

3. The method of claim 1 further comprising the steps of serially collecting a plurality of sheets of cheese curd while maintaining the continuity of the cheese curd structure in said sheets.

4. The method of claim 1 further comprising the steps of:
   collecting said sheet in generally sinusoidal form.

5. The method of claim 1 further comprising the step of maintaining vacuum on said superposed portions after cutting said block.

* * * * *